US010607315B2

(12) United States Patent
Roulet et al.

(10) Patent No.: US 10,607,315 B2
(45) Date of Patent: Mar. 31, 2020

(54) CONSTANT RESOLUTION CONTINUOUS HYBRID ZOOM SYSTEM

(71) Applicant: 6115187 Canada, Inc., Montreal (CA)

(72) Inventors: Patrice Roulet, Montreal (CA); Jocelyn Parent, Montreal (CA); Xavier Dallaire, Montreal (CA); Pierre Konen, Saint-Bruno (CA); Pascale Nini, Montreal (CA)

(73) Assignee: ImmerVision, Inc., Montreal, Quebec (CA)

( * ) Notice: Subject to any disclaimer, the term of this patent is extended or adjusted under 35 U.S.C. 154(b) by 0 days.

(21) Appl. No.: 16/243,492

(22) Filed: Jan. 9, 2019

(65) Prior Publication Data

US 2019/0213710 A1 Jul. 11, 2019

Related U.S. Application Data

(60) Provisional application No. 62/615,252, filed on Jan. 9, 2018.

(51) Int. Cl.
| | | |
|---|---|---|
| *G06T 3/40* | (2006.01) | |
| *H04N 5/232* | (2006.01) | |
| *G06T 5/00* | (2006.01) | |
| *H04N 5/345* | (2011.01) | |
| *H04N 5/341* | (2011.01) | |
| *H04N 5/347* | (2011.01) | |

(52) U.S. Cl.
CPC .............. *G06T 3/40* (2013.01); *G06T 5/006* (2013.01); *H04N 5/23229* (2013.01); *H04N 5/23296* (2013.01); *H04N 5/347* (2013.01); *H04N 5/3415* (2013.01); *H04N 5/3454* (2013.01)

(58) Field of Classification Search
CPC ....... G06T 3/40; G06T 5/006; H04N 5/23229; H04N 5/23296; H04N 5/3415; H04N 5/3454; H04N 5/347
USPC ....................................... 348/240.2
See application file for complete search history.

(56) References Cited

U.S. PATENT DOCUMENTS

| | | | | |
|---|---|---|---|---|
| 2007/0229680 A1* | 10/2007 | Kinney | ............ | G06T 3/40 348/240.2 |
| 2010/0053365 A1* | 3/2010 | Abe | ............ | H04N 1/3875 348/222.1 |
| 2012/0026366 A1 | 2/2012 | Golan et al. | | |

FOREIGN PATENT DOCUMENTS

WO 2006080585 A2 8/2006

OTHER PUBLICATIONS

Int'l Search Report and Written Opinion dated Apr. 29, 2019 in Int'l Application No. PCT/IB2019/050169.

* cited by examiner

*Primary Examiner* — Sinh Tran
*Assistant Examiner* — Zhenzhen Wu
(74) *Attorney, Agent, or Firm* — Panitch Schwarze Belisario & Nadel LLP (57) ABSTRACT

The present invention relate to an optical apparatus to capture images of a wide-angle scene with a single camera having a continuous panomorph zoom distortion profile. When combined with a processing unit, the hybrid zoom system creates an output image with constant resolution while allowing continuous adjustment in the magnification and field of view of the image without interpolation like a digital zoom system or without any moving parts like an optical zoom system.

26 Claims, 6 Drawing Sheets

CONSTANT RESOLUTION CONTINUOUS HYBRID ZOOM SYSTEM

CROSS-REFERENCE TO RELATED APPLICATIONS

The present application claims the benefit of U.S. Provisional Patent Application No. 62/615,252, filed on Jan. 9, 2018, entitled "Constant Resolution Continuous Hybrid Zoom System," currently pending, the entire contents of which are incorporated by reference herein.

BACKGROUND OF THE INVENTION

Embodiments of the present invention relate to an optoelectronic apparatus to capture images of a wide-angle scene with a single camera having a continuous panomorph zoom distortion profile. To create a continuous zoom for a human observer, instead of using pixel interpolation in order to maintain the amount of pixels in the final image or moving the optical element to change the magnification and reduce the lens field of view ("FoV"), or a combination of two or more cameras with different FoV, embodiments of the present invention use a distortion profile with a large constant magnification in a central area and a dropping magnification in the rest of the field of view. The distortion profile is designed as to reduce the pixel interpolation and maintain an almost constant image resolution.

Some existing continuous zoom system uses multiple cameras with different FoV in order to archive a continuous zoom effect. By combining the information captured with the two cameras, it is possible to create a zoomed in image without the need to resort to pixel interpolation. However, the fact that multiple cameras are necessary implies tradeoffs with cost, power consumption, size limitations, weight limitations and image artifacts created by the fusion of images coming from different cameras. A solution using only one camera would be free of those tradeoffs.

Existing pure optical zoom system can vary the magnification and field of view of the lens by moving some elements inside the optical lens. However, having moving parts inside optics increase the size and the complexity. For some applications, such as for miniature wide-angle lenses for consumer electronics, the size constraints are too strict to allow the movement of some optical elements to create an optical zoom.

On the other hand, existing pure digital continuous zoom solutions are applying computational operations to the image to modify the output field of view, which as a side effect from having to display with the same output size, create new pixels from the original pixels at some point during the operation. This process is also called upsampling, oversampling or expansion. This can be done through extrapolation, interpolation or other means. These new pixels calculated from digital zoom do not contain more optical information about the scene than the original image. This computational operation is not able to create extra information and is very limited in increasing the output image quality.

There is a need of a camera with a continuous resolution zoom distortion profile and associated algorithms reducing interpolation, maintaining a high quality level of information about the original scene on each pixel.

BRIEF SUMMARY OF THE INVENTION

To overcome all the previously mentioned issues, embodiments of the present invention describe a method using an imager including a wide-angle optical lens having a strong magnification variation from the center to the edge and an image sensor having multiples image sensor pixels in combination with a processing unit. The resulting continuous hybrid zoom system is able to output an image with constant resolution while allowing continuous adjustment of the magnification and field of view of the image, simultaneously limiting the interpolation created by pure a digital zoom system and limiting the movement of parts like those in a pure optical zoom system. In a preferred embodiment according to the present invention, the continuous zoom system includes no movable optical element at all in the imaging system. In another embodiment according to the present invention, the only movement in the imaging system is related to an auto focus function and may include movement of the image sensor, of an optical element or of the whole lens with respect to the image plane. This auto focus can utilize a fixed setting or a smart auto focus that adapts to the scene content visible or not in the output image depending on the selected output image field of view.

To offer a continuous magnification with a constant resolution, the wide-angle lens must have a specific distortion profile. In the central region of the field of view, corresponding to the maximum magnification hybrid zoom (or minimum design field of view), the distortion profile must have an almost constant magnification to create an output with constant resolution close to a 1:1 pixel ratio between image sensor useable pixels and output image pixels. Then, for larger fields of view of the wide-angle lens than the minimum design field of view, the magnification (distortion profile) drops in order to maintain a similar image resolution even with an increasing output image field of view. At the edge of the field of view of the wide-angle lens, the magnification is minimum and defines the maximum design field of view of the continuous hybrid zoom system. This way, for any selected output image field of view, the resolution, in pixels/degree, at the edge of the output image is always close to having a 1:1 pixel ratio with the image sensor pixels at that position.

In an alternate embodiment of the present invention, the lens, instead of having a higher magnification in the center and lower magnification toward the edge, the digital image from the imager has a zone of maximum magnification in an off-centered region of the image, allowing for the hybrid zoom area to also be off-centered.

In an alternate embodiment of the present invention, the camera, instead of having a wide angle lens with a specific distortion profile such as higher magnification in the center and lower magnification toward the edge, the camera can use any wide angle lens and bin the pixels to create the same type of effect, such as higher magnification in the center and lower magnification toward the edge by a processing unit, electronics or other suitable hardware and/or software.

At the minimum field of view setting, the processing unit or the sensor unit can simply perform a crop of the input image to create the output image because the constant magnification already produces almost a 1:1 ratio between the image sensor pixels and the output image pixels. With hybrid zoom settings other than the minimum field of view, there is an over sampling of the source image compared to the output image and residual positive distortion. The processing unit can then digitally compress the center of the image to reduce oversampling and lower the image resolution from the input resolution to the required output resolution. This compression by the image processing unit is progressively softer until the selected edge of the FoV, where the ratio become 1:1 by design of the distortion profile for the wide-angle lens.

In some embodiments of the present invention, a smart binning processing unit can be coupled with the image sensor or a smart binning hardware can be used to pre-compress the central part of the image before sending the image to the processing unit. A smart binning image sensor can perform 1×1, 2×2, 3×3, 1×2, 1×3, 2×3, or any other combination of pixel binnings required to lower the image resolution in selected areas of the image while always limiting the interpolation ratio between the source resolution and the output image resolution. This smart binning image sensor allows lowering of the data bandwidth or required compression by the processing unit, which is especially useful if the processing unit would instead require time and power to do the same task. This smart binning image sensor is also useful by lowering the transmitted image size, allowing savings on the quantity of useless information transmitted. Finally, it can allow an increase in the frame rate of the camera or the signal-to-noise ratio.

In some embodiments according to the present invention, the camera can be combined with another camera, can also include optical zoom based on moving parts or can include digital zoom based on interpolation or oversampling, or the like.

BRIEF DESCRIPTION OF THE SEVERAL VIEWS OF THE DRAWINGS

The foregoing summary, as well as the following detailed description of a preferred embodiment of the invention, will be better understood when read in conjunction with the appended drawings. For the purpose of illustration, there is shown in the drawings an embodiment which is presently preferred. It should be understood, however, that the invention is not limited to the precise arrangements and instrumentalities shown.

In the drawings.

DETAILED DESCRIPTION OF THE INVENTION

The words "a" and "an", as used in the claims and in the corresponding portions of the specification, mean "at least one."

Figure 1:
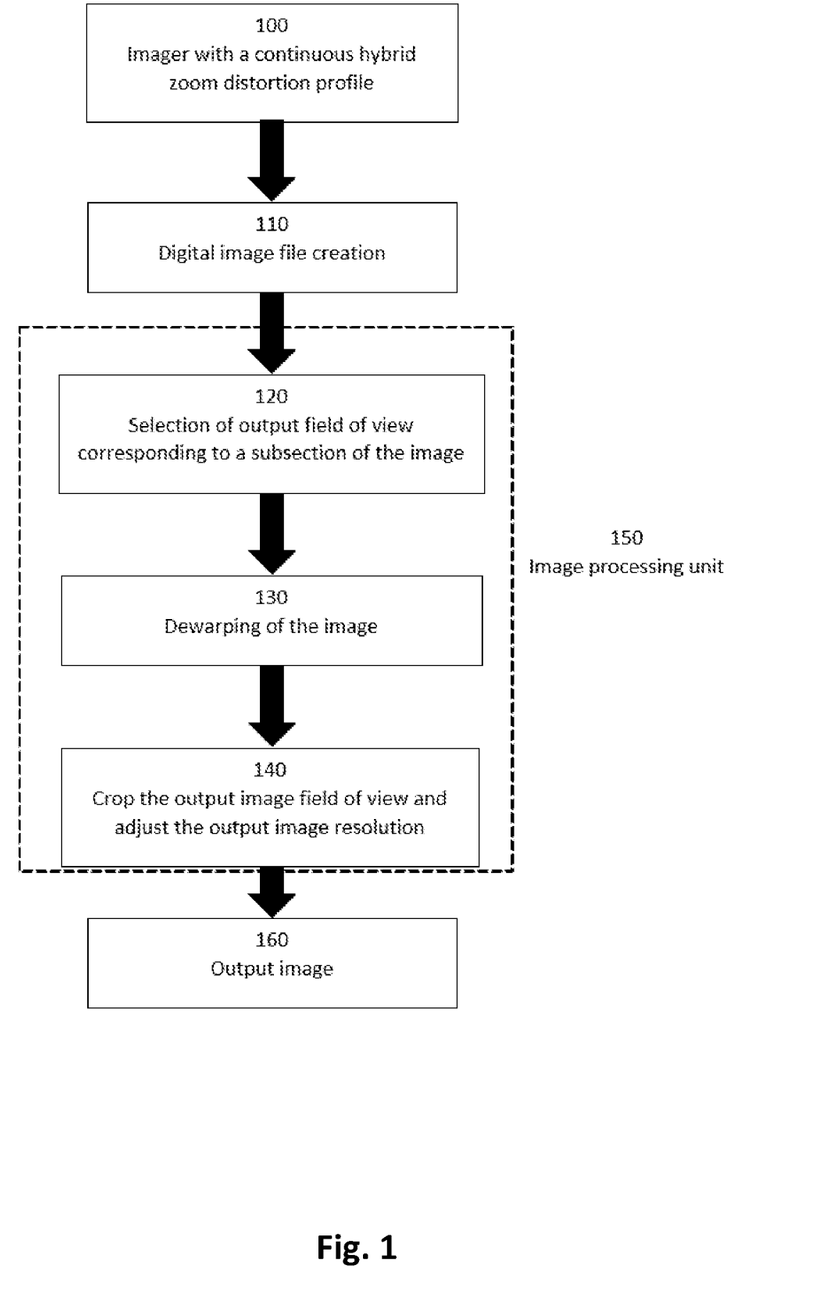
FIG. 1 is a flow chart showing the continuous hybrid zoom process.

FIG. 1 shows a flow chart explaining the whole process for the continuous hybrid zoom system according to the present invention. The first step 100 is to use an imager having an imaging system with a distortion profile, as will be explained with reference to FIG. 3, and an image sensor. The imaging system generally includes a classical imaging lens with refractive elements either in plastic or in glass, but could also include other optical elements such as, but not limited to, diffractive elements, mirror, filters or the like. This imager 100 is used to capture a scene by converting the optical image from the imaging system to a digital image file at step 110 using its image sensor. The image sensor includes multiple image sensor pixels and can be of any type, such as, but not limited to, CCD, CMOS, NMOS or the like. The digital image file has a digital image distortion with a generally constant magnification from the center of the field of view up to the minimum design field of view and a generally decreasing magnification from the minimum design field of view up to the maximum design field of view. The distortion in the digital image results in a preferred embodiment from the optical distortion of the imaging system, but could also result in other embodiments from smart binning of pixels done by a smart binning unit or from a combination of both optical distortion in the imaging system of the imager and smart binning of pixels by a smart binning unit. The smart binning unit is located either inside the image sensor or in a separate unit where a software or hardware is receiving the raw image from the image sensor and processing it to create the digital image file. The captured digital image is then transferred to the image processing unit 150, inside which the output field of view value between the minimum design field of view and the maximum design field of view is selected at step 120 using an output field of view selection unit. This selection unit for selecting the output field of view can be of any kind, including a pre-stored value in the processing unit, a manual input by an user, an automated input from an algorithm unit based on the scene content or requirement by the display or the application or any other source for selecting the output field of view or equivalently the zoom level. The image processing unit 150 then uses the knowledge of the exact digital image distortion of the digital image from the imager 100, the distortion being either due to the imaging system or to the smart binning image sensor, to process the digital image by dewarping it at step 130. The dewarping is used to generate an image without distortion of the selected zoom area. In some embodiments, the processing to dewarp the digital image creates a processed image following a known projection depending on the application. This known projection of any shape, includes, but is in no way limited to, a rectilinear projection, an equidistant projection, a stereographic projection, an equisolid angle projection, an orthographic projection, any projection defined by polynomial coefficients or the like. During the dewarping, the processing unit keeps the ratio between the number of image sensor pixels and the number of processed image pixels close to 1:1 in a region generally at the edge of the selected output field of view, but this region could be located elsewhere in the field of view for some specific applications. If the selected output field of view is larger than the minimum design field of view, the image processing unit then crops the field of view to the selected value and adjusts the output resolution of the image at step 140 to create the final processed image. The resulting processed image can then optionally be outputted from the processing unit at step 160, either to a display device or to an algorithm unit.

Figure 2:
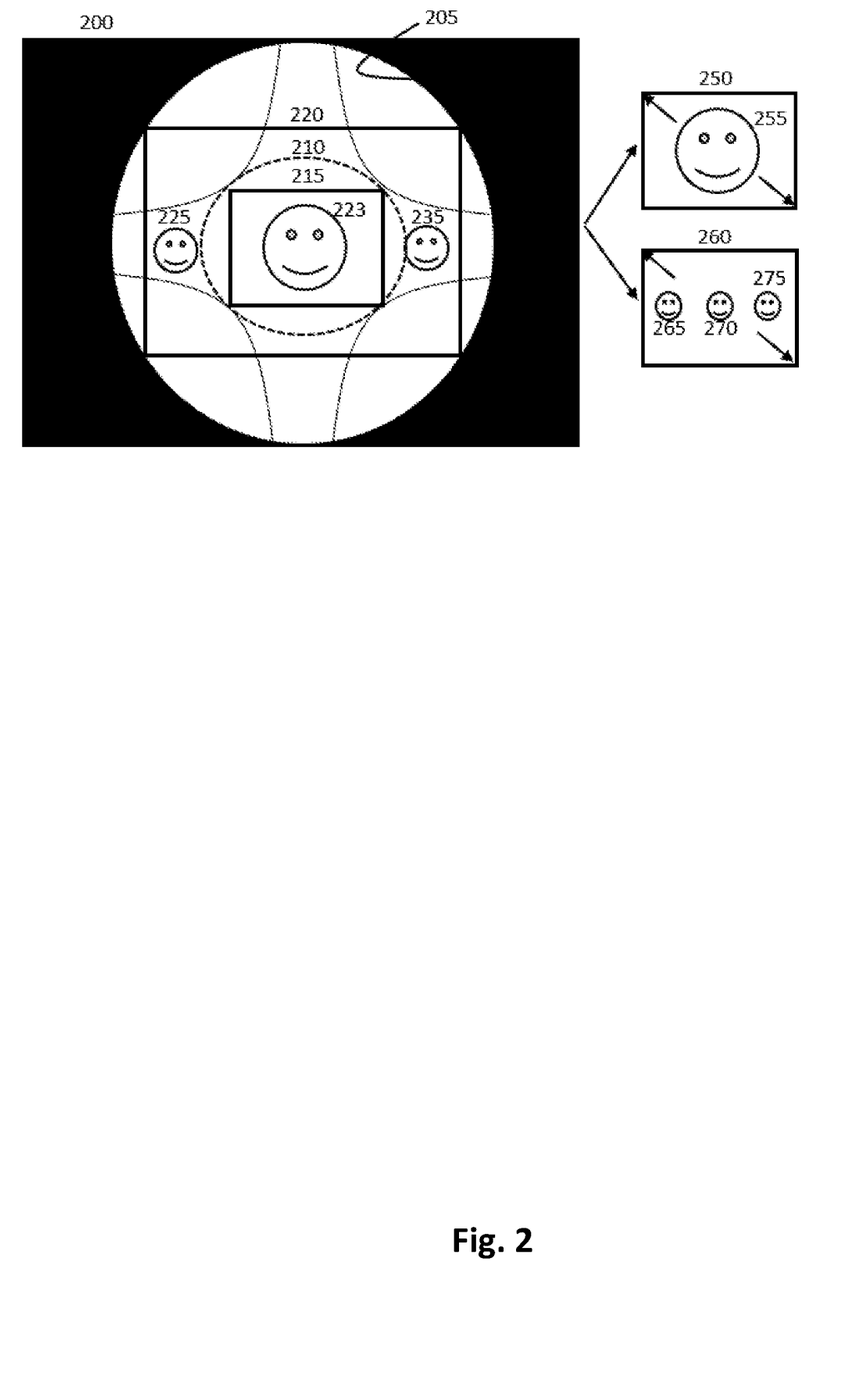
FIG. 2 is a schematic showing the image captured from the wide-angle lens with a constant magnification in the center and then decreasing toward the edge.

FIG. 2 shows an example of a digital image captured by the image sensor using an imager designed for continuous hybrid zoom according to an embodiment of the present invention. In a preferred embodiment, the imaging system creates an optical image of a scene in the image plane and the image sensor is located at this image plane. The rectangle 200 represents the full digital image captured by the sensor, including the image footprint 205 created by the imaging system. This footprint 205 can sometimes be circular with wide-angle lenses when the image sensor horizontal and vertical dimensions are larger than the imaging lens image size, but the exact shape of the image footprint 205 on the full digital image 200 can be of any shape according to the present invention, including rectangular, elliptical, part of a circle cropped vertically or horizontally, or the like. As such, in some embodiments according to the present invention, instead of the rectangle 200 representing the full digital image captured by the sensor, the rectangle 220 represents the imaging area with active pixels of the image sensor and the digital image file has no black corner. In both cases where the image sensor is represented by the rectangle 200 or by the rectangle 220, a central zone 210 has a preferably constant magnification that is a maximum magnification value of the whole field of view. Outside of this central zone 210, the magnification is lower and drops with increasing the field of view. An image area representing the maximum zoom level 215 is located inside the central zone 210 of almost constant magnification. This image area ideally has a source pixel to output image pixel ratio close to 1:1 when the selected output field of view is the minimum design field of view. Inside the scene, there are 3 faces 223, 225 and 235 which would appear almost the same size on a regular camera. Here, since the face 223 is inside the area of larger magnification, (central zone 210), its image on the sensor is larger than the faces 225 or 235. After processing by the image processing unit, the final output depends on the selected zoom level or the selected output field of view. The output image 250 represents the output when the zoom level is maximum. In that case, because of the high magnification in the center of the original image created by the lens with distortion, almost no interpolation is needed to modify the number of pixels to fit the output resolution compared to pure a digital zoom, and the face 255 is displayed with almost 1:1 pixel ratio. The output image 260, on the other hand, represents the output when the zoom level is minimum. Here, the central area has been compressed by the image processing unit so the size in pixels of the face 270 is almost equal to the size of the faces 265 and 275. The exact compression applied by the processing unit depends on the selected dewarping projection depending on the application. The edge of the field of view is processed with almost a 1:1 pixel ratio without compression while the central area is compressed, using several captured pixels for each displayed pixel. Here by compression, we are referring to the process of using a higher number of pixels from the original digital image file in an area to compress to produce a processed image with a lower number of pixels in this compressed area, a process also known as pixel downsampling, pixel subsampling or pixel decimation. Any continuous zoom level between the maximum zoom and the minimum zoom can be achieved the same way, always having a nearly 1:1 pixel ratio at the edge area of the output image because of the unique shape of the distortion profile from the lens. At every zoom level, the number of pixels in the input image is always over 1:1 or close to 1:1 for the full field of view. In some embodiments according to the present invention, the processing unit simultaneously processes a single digital image 200 into multiple processed images 250 and 260 having different selected output field of view values, which would be impossible with a typical zoom system with moving optical elements.

Figure 3:
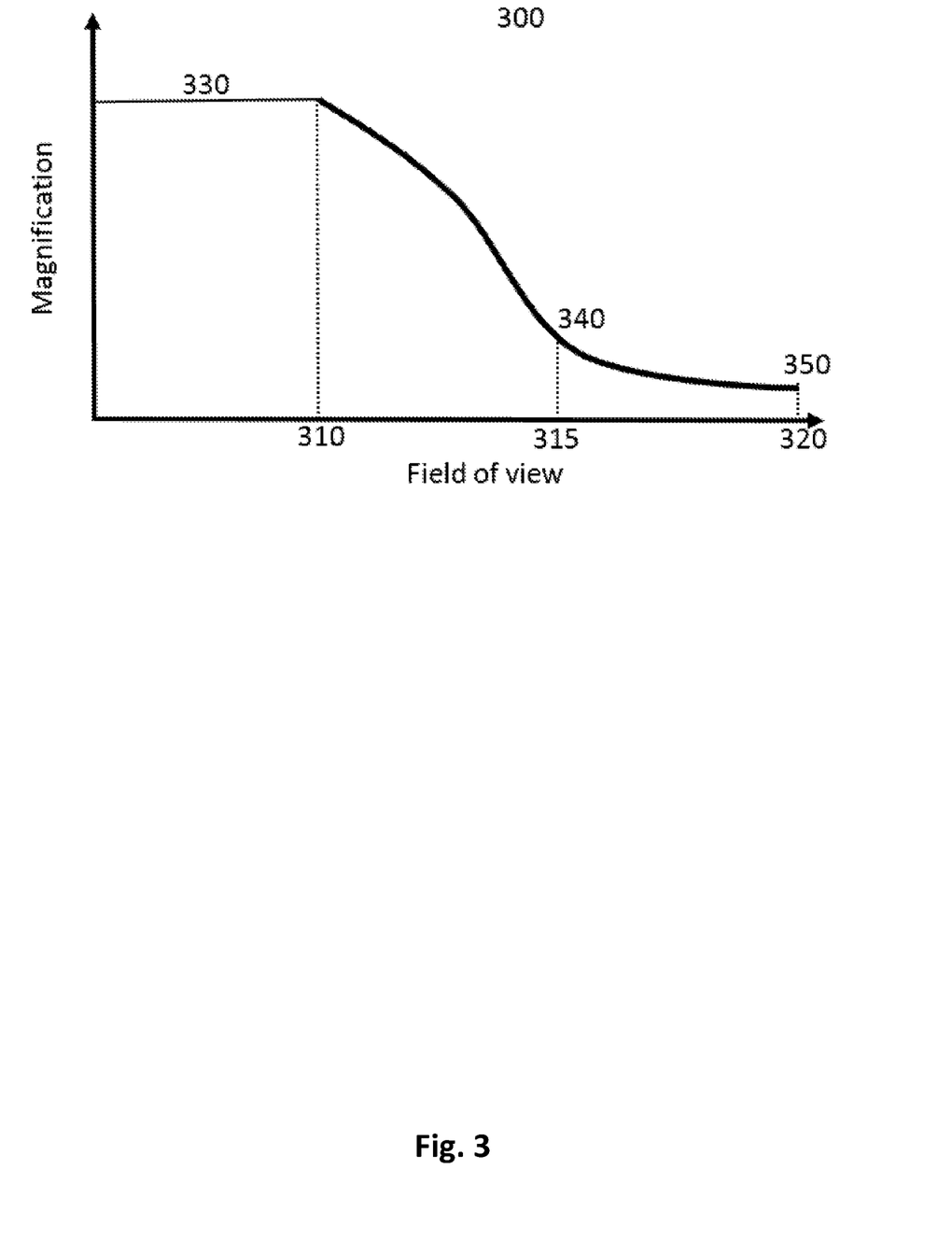
FIG. 3 is a graph showing an example magnification as a function of the field of view.

FIG. 3 shows an example graph 300 of the magnification (or distortion) of an imager with hybrid zoom distortion as a function of the field of view according to the present invention. In a preferred embodiment, the digital image distortion is such that the magnification is maximum in a central area of the image and the magnification is minimum in an area near the maximum design field of view. The field of view 310 represents the minimum design field of view that corresponds to the maximum zoom level. For all fields from the center to the minimum design field of view 310, the magnification value is ideally close to a constant as shown with the plateau 330. However, this plateau 330 is not a strict requirement according to the present invention and a departure from a constant plateau is allowed within the scope of the present invention. The field of view 320 represents the maximum design field of view that corresponds to the minimum zoom level. At this field of view, the magnification 350 is generally the lowest value in the entire image. At any output field of view 315 located in the region between the minimum design field of view 310 and the maximum design field of view 320, the magnification 340 is between the maximum magnification 330 and the minimum magnification 350. In some embodiments according to the present invention, the minimum design field of view value 310 is defined as a fraction of the maximum design field if view 320 such that the ratio of the field of view 310/320 is substantially equal to the ratio of the minimum magnification by the maximum magnification 350/330. In some other embodiments, there is a difference up to ±10% between these 2 ratios. As an example, for a lens having a maximum design field of view 320 of 75°, a maximum magnification 330 of 50 pixels/degree, a minimum magnification 350 of 10 pixels/degree, the ratio of minimum magnification divided by the maximum magnification is 10/50, or a ratio of 1/5. Since the ratio of the minimum design field of view by the maximum design field of view must be equal, we find that the minimum design field of view value 310 is 15° in this example. In some other embodiments according to the present invention, instead of defining the minimum design field of view from the maximum/minimum magnification ratio, the minimum design field of view 310 is instead defined as the field of view where the magnification, calculated in pixels per degree, is outside a ±10% range from the magnification value at the center of the field of view or at the center of the area of interest when the area of interest is off-centered. In some embodiments according to the present invention, the ratio between the maximum magnification and the minimum magnification is at least 2×. Ideally, the ratio between the number of image sensor pixels and the number of processed image pixels is as close as possible to 1:1 in a region at the edge of the selected output field of view. However, in some embodiments according to the present invention, this ratio can be up to 2:1 or 1:2 in a region at the edge of the selected output field of view. To get a ratio close to 1:1 at all continuous zoom levels, the magnification value 340 at every output field of view angle 315, represented by the symbol θ, must respect the condition:

$$\text{Magnification}(\theta) > \frac{\text{Min.design.}FoV}{\theta} \text{Max.}Mag.$$

For example, if the minimum design FoV 310 has a value of 15° and the maximum Magnification 330 has a value of 5× compared to the minimum magnification 350, the Magnification 340 at an output FoV 315 of 60° must be greater than the value given by the equation below:

$$\text{Magnification}(60°) > \frac{15°}{60°} 5x$$

which results in a magnification larger than 1.25× at 60° compared to the minimum magnification 350 at the maximum design field of view of 75°. In some embodiments of the present invention, some departure from the above formula by ±25% are allowed to account for manufacturing errors from lenses to lenses or for design decisions to have a smoother distortion curve and simpler manufacturing. In this case, the magnification at a given output field of view in the region between the minimum design field of view and the maximum design field of view is such that:

$$0.75 \frac{\text{Min.design\_FoV}}{\theta} \text{Max}.Mag <$$

$$\text{Magnification}(\theta) < 1.25 \frac{\text{Min.design\_FoV}}{\theta} \text{Max}.Mag$$

In some other embodiments, instead of satisfying the ±25% condition at every fields of view between the minimum design field of view and the maximum design field of view, the condition could be satisfied only at a number of discrete output field of view values at which the system according to the present invention is used. This FIG. 3 only shows the magnification graph of an example embodiment according to the present invention where the plateau 330 and the curve 340 are ideal for an equidistant dewarping (f-theta projection), but other magnification graphs are possible. For example, in other embodiments according to the current invention, when the magnification is given as a surface magnification instead of a linear magnification, the required magnification must follow an equation proportional to 1 over the square root of θ instead of an equation proportional to 1 over θ. For this reason, FIG. 4 shows a more general graph.

Figure 4:
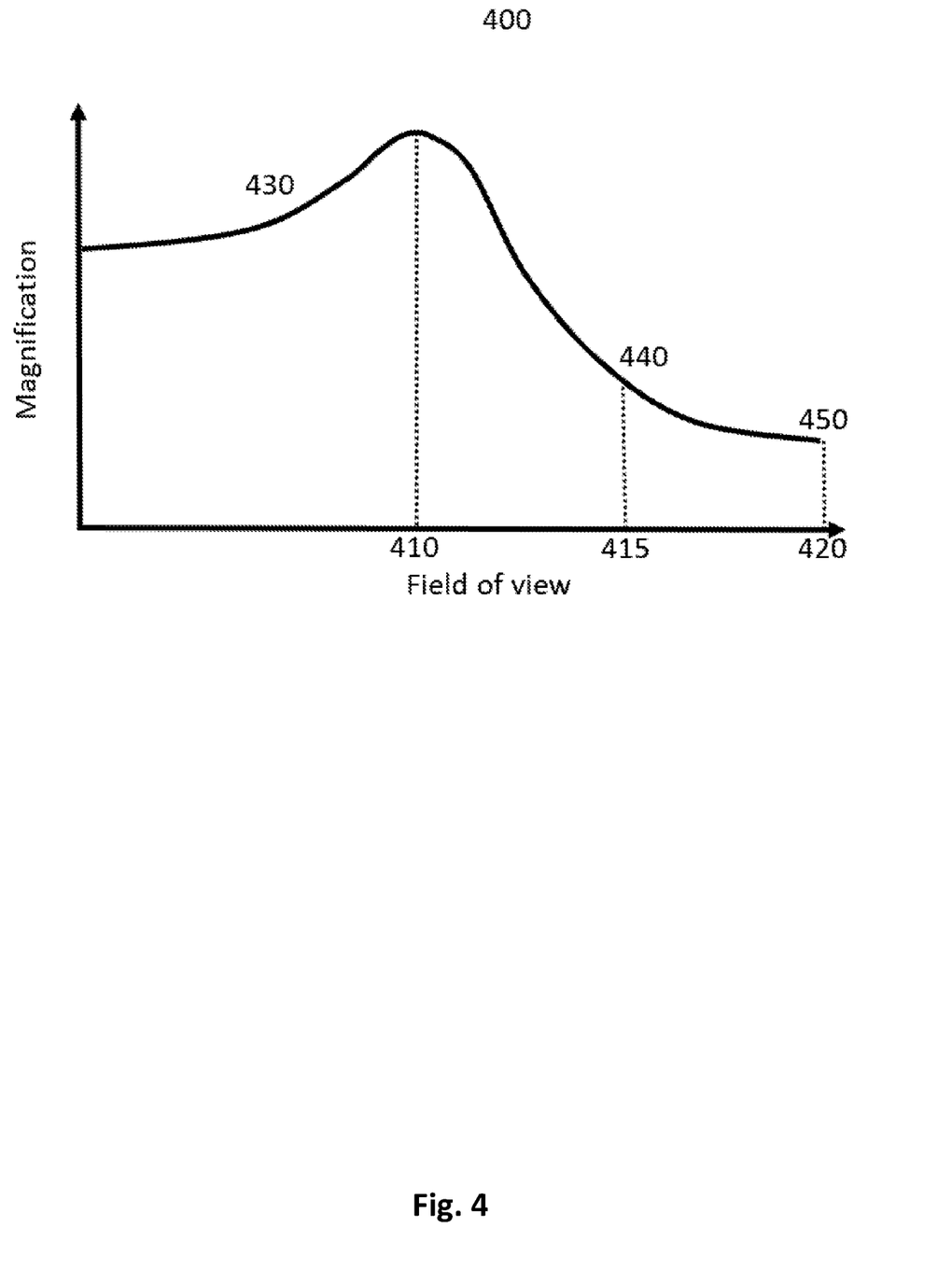
FIG. 4 is a graph showing a more general magnification curve as a function of the field of view.

FIG. 4 shows a more general magnification curve 400 according to some other embodiments according to the present invention. In this magnification curve, there is a minimum design field of view 410 defined. The magnification curve in the central area between the central FoV and this minimum design FoV 410, instead of a plateau of constant magnification 330 like in the example of FIG. 3, can be of any shape, including, but in no way limited to, a rectilinear lens, also known as an f-tan(theta) projection lens. The magnification 430 in this central area can be designed such that the desired output view when the selected output field of view is the minimum design field of view, as in view 250 at FIG. 2, can be directly outputted without any dewarping because there is no unwanted distortion to remove by the processing unit. The magnification value at the minimum design field of view 410 can be the maximum magnification of the imager, but this is not a strict requirement in this embodiment of the present invention. The magnification graph 400 also has a maximum design FoV value 420 where the magnification value 450 is often minimal. At the maximum design FoV 420, or at any other field of view value 415 located between the minimum design FoV 410 and the maximum design FoV 420, as in view 260 at FIG. 2, a dewarping is then done by the processing unit to create a dewarped view. The dewarped view can be of any projection required by the application or the display, but is such that the ratio between the number of image sensor pixels and the number of output image pixels is close to 1:1 in an area of the output field of view. At any other location of the output field of view, the processing unit compresses the original digital image in order to produce the desired projection. In the general case of FIG. 4, the magnification value 440 at any selected FoV value 415 is not constrained by a specific equation, but only by the desired dewarped output view projection such that the 1:1 pixel ratio condition is respected in at least one position in the selected output FoV 415.

Figure 5:
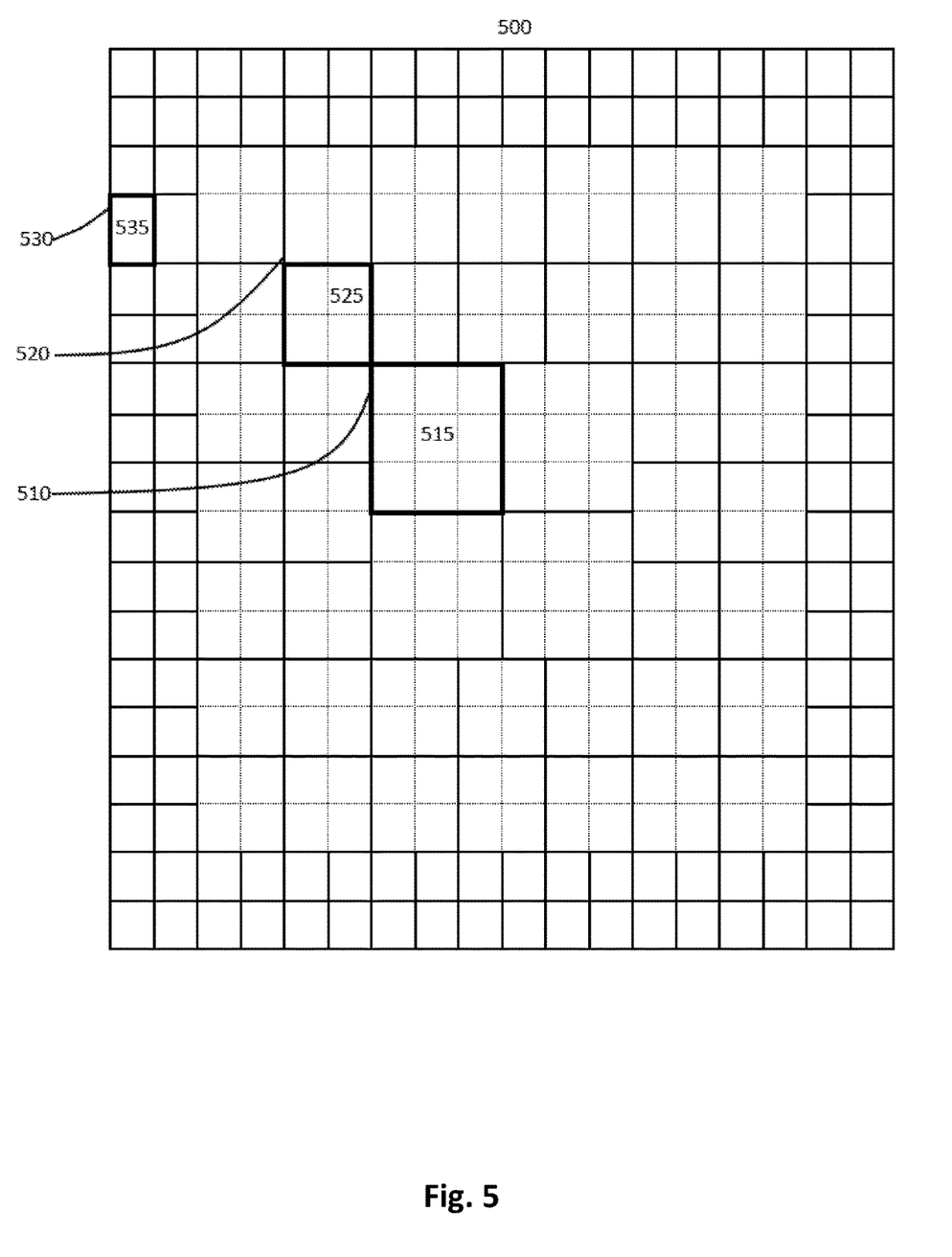
FIG. 5 is a schematic showing how the smart binning sensor is used to lower compress the resolution in over-sampled parts of the image.

FIG. 5 shows an example of using an optional smart binning sensor or processing unit as in some embodiments according to the present invention. In this image sensor 500, the number of pixels is 18×18, represented by the smallest squares. This 18×18 sensor is only an example to schematize the concept, but the idea would be the same with image sensors of multiple megapixels, as are used in many applications. When this smart binning sensor is used in collaboration with the lens having hybrid zoom distortion, it can use binning or not depending on the selected zoom level. When at the maximum zoom level, only the central part of the image is used and because the magnification from the lens is almost constant in that part, almost no binning is required from the sensor. Hence, all the original pixels are read in the useful area defined by the selected output field of view. On the other extreme, when the hybrid zoom is at the minimum zoom level, meaning the maximum design field of view, there is almost a 1:1 pixel ratio at the edge of the field of view where the magnification is minimal, but the central area is over sampled. In this case, the smart binning sensor can use, for example, the pixel 535 in a 1×1 area 530 toward the edge where no oversampling is done. In the center, where the oversampling is maximum, the 9 individual pixels 515 can be binned together in a 3×3 area 510. This smart binning process is applied to limit the number of pixels read by the image sensor or transmitted to the processing unit, allowing an increase in the reading frame rate on the sensor or a lowering of the required bandwidth to transmit the image. In the intermediate area between the center and the edge, the 4 individual pixels 525 can be binned together in a 2×2 area 520. In a real sensor or smart binning unit, the smart binning is not restricted to square areas of 1×1, 2×2 or 3×3, but can also be rectangular binning of 1×2, 2×3, 1×3 or any other combination as long as the final image from the smart binning sensor has enough resolution at all points to be over or close within ±25% to the output resolution of the output image at the selected zoom level. While the smart binning is preferably done as soon as possible in the capture process, at the sensor level, the location of the smart binning is not limited in the present invention. Instead of doing the smart binning in the sensor, the smart binning could also be done by any hardware or software process in a smart binning unit during image capture at any moment before the digital image is sent to the image processing unit.

Alternatively, in other embodiments of the present invention, the smart binning sensor itself can be used to generate the highly distorted image with more pixels in the central part of the FoV compared to the edge instead of doing it optically with a wide-angle lens having high distortion. Alternatively, the highly distorted original image can be created from a combination of distortion in the optical lens and a smart binning sensor working together. This smart binning has the benefits to change the magnification ratio and location according to external or internal parameters on demand and even in real-time.

Figure 6:
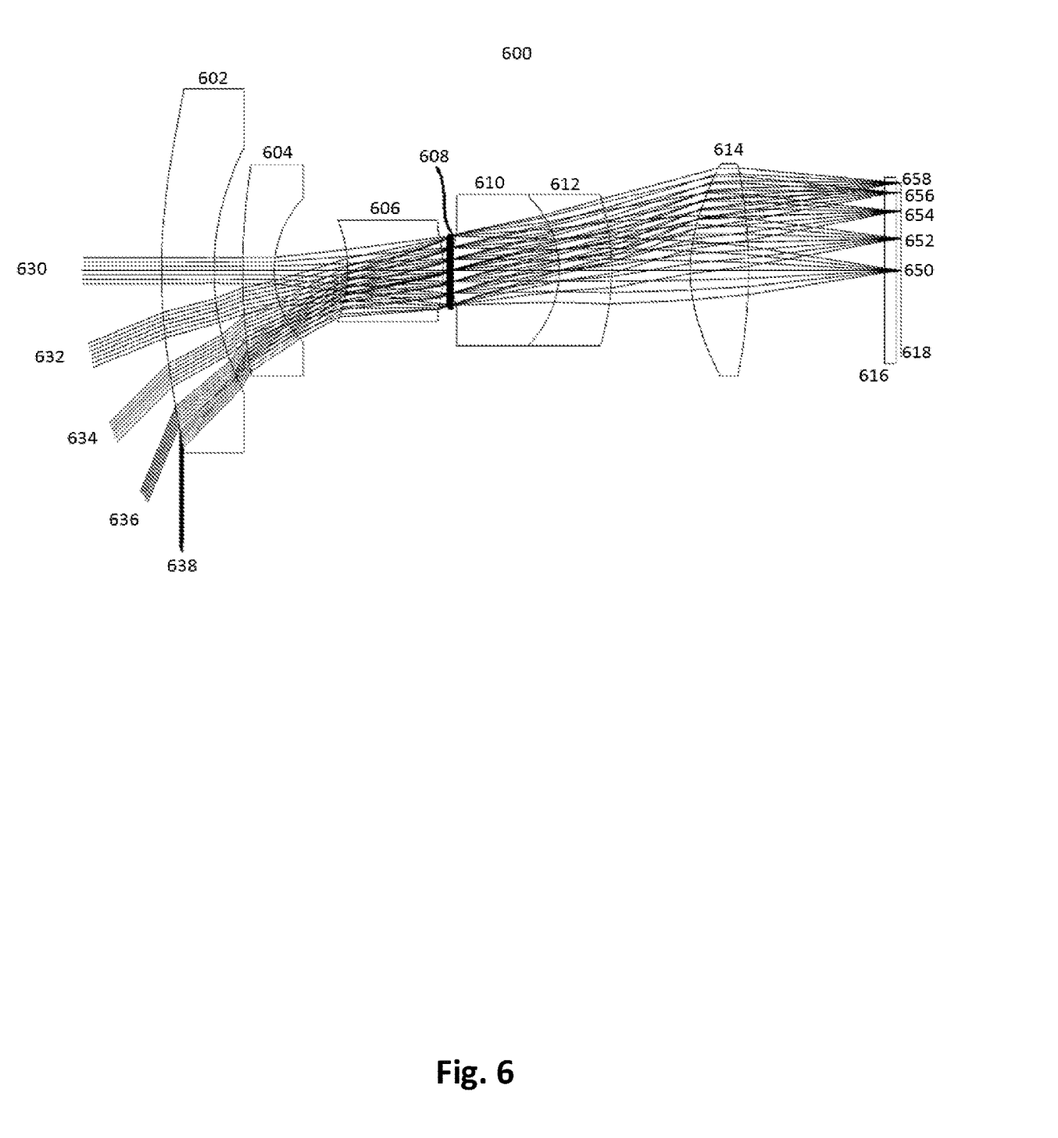
FIG. 6 is an example layout of an optical lens having a large magnification ratio from the center to the edge of the field of view.

FIG. 6 shows an example layout of an imaging lens with continuous hybrid zoom distortion according to an embodiment of the present invention. In this example, the wide-angle 600 includes 6 optical elements 602, 604, 606, 610, 612 and 614, an aperture stop 608, a sensor coverglass 616 also potentially acting as a filter, and an image plane 618. However, this exact number of element is not a requirement according to the present invention and the same inventive method could be achieved with more or less optical elements. In this example, the maximum full field of view is 180° as represented by the vertical rays entering the lens at 638 with an angle of 90° with the lens axis, but the method according to the present invention is compatible with any field of view, from very narrow to extremely wide-angle. In this example schematic, the rays of light enter the lens from various equally spaced angles between 0° and 90° numbered 630, 632, 634, 636 and 638, but in the real lens, the rays of light enter the lens at all continuous angles between 0° and the maximum field of view. The beam of light from 630 hits the image sensor at 650, the beam of light from 632 hits the image sensor at 652, the beam of light from 634 hits the image sensor at 654, the beam of light from 636 hits the image sensor at 656 and the beam of light from 638 hits the image sensor at 658. Even if the entering beam of light 630, 632, 634, 636 and 638 are equally spaced angularly, the positions on which each reaches the image sensor are not equally spaced. Because of the higher magnification in the center as compared to the magnification toward the edges as illustrated in FIG. 2, the distance between the position 650 and 652 is greater than the position between 656 and 658. In the present schematized embodiment, the lens elements 602 and 614 include aspherical surfaces in order to help to shape the distortion profile of the imaging lens. However, this is not a requirement according to the present invention and all surfaces could be spherical in another embodiment. Furthermore, other common types of optical surfaces could be used in the lens design to create the desired magnification curve or to improve other optical performances, including, but in no way limited to, diffractive surfaces, Fresnel surfaces, conic surfaces, cylindrical surfaces, freeform surfaces, holographic surfaces, surfaces with meta-material, or the like. In the present embodiment, all optical elements are refractive, made either of glass, plastic or crystal. However, in some embodiments according to the present invention, a refractive surface could also be used either to create the desired continuous zoom magnification curve or to improve other optical performances. Finally, the lens elements 610 and 612 in this example embodiment form a doublet in order to improve the chromatic performances of the imaging system. Using one or multiple doublets or triplets is possible according to the present invention, but is not required.

In some embodiments according to the present invention, the hybrid zoom system can use multiples cameras to capture the images with at least one camera using a lens with continuous hybrid zoom distortion. In that case, the imager includes multiple imaging systems and multiple image sensors creating multiple digital images. This way, each imaging system can have different parameters, including orientation and position in the scene, position of maximum magnification where maximum zoom will be possible, strength of maximum magnification or minimum and maximum FoV for hybrid zoom. The image processing unit then receives the multiples images coming from the multiple cameras, each with a potential hybrid zoom in their region of interest. In some embodiments according to the present invention, the multiple digital images are stitched together before processing by the processing unit, if required. The processing unit can then dewarp the zone of interest and adjust the resolution for the output image to the final user, as was the case with a single camera with continuous zoom system.

In some other embodiments according to the present invention, the continuous zoom optical system is combined with digital zoom to create a hybrid system using the advantages of both the continuous zoom and a digital zoom.

In some embodiments according to the present invention, the image processing unit can apply some optional image improvement before outputting the image. This can include basic improvements in, for example, contrast, sharpness, de-noise, white-balance, color correction or the like. This can also include more advanced improvement techniques, including automated improvement using automated computer imaging techniques such as computational imaging, image processing or from an artificial intelligence algorithm. This can be either programmed or self-learned via deep learning neural networks. One example embodiment of using "A.I." to enhance the image is to use deep learning to learn the 3D information from the captured image and then apply some image blur for objects far from the focus point. Since the wide-angle lens has a distortion profile with a big change of magnification across the field of view, any movement of the camera will make an object appear bigger or smaller depending on its location in the field of view and on its distance from the lens. The variation in the images can then be used by an A.I. algorithm to measure the distance and calculate 3D information. Finally, this 3D information can be used to enhance the output in any way required by the final user.

In some other embodiments according to the present invention, the continuous zoom optical camera in used with any of the three automatic common settings, auto focus (AF), auto exposure (AE) and auto white balance (AWB), a technique often known as camera 3A corrections. These 3A corrections can be applied at the hardware level inside the camera, in a hardware improvement unit not part of the camera, in a software algorithm or in combination of more than one of the above.

All of the above are figures and examples of specific image distortion transformation units and methods. In all these examples, the imager is not limited to wide-angle and can have any field of view, from very narrow to extremely wide-angle. In all of these examples, the method is presented in picture mode for simplicity, but the method can also be applied multiple times in sequence to work in video mode. All of these examples are not intended to be an exhaustive list or to limit the scope and spirit of the present invention. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for creating a continuous zoom optical system using an imager creating a digital image file having a variable magnification across a field of view in order to have a ratio close to 1:1 between a number of image sensor pixels and a number of output image pixels in a region at an edge of a selected output field of view, the method comprising:

a. creating, using an imager having at least an imaging system and an image sensor, an optical image of a scene in an image plane;

b. converting, by the image sensor of the imager, the optical image into a digital image, the image sensor including a plurality of image sensor pixels, the digital image having a digital image distortion with a generally constant magnification from a center of the field of view up to a minimum design field of view and a generally decreasing magnification from the minimum design field of view up to a maximum design field of view;

c. receiving, by a processing unit, a selection of an output field of view value between a value corresponding to the minimum design field of view and a value corresponding to the maximum design field of view; and d. processing, by the processing unit, the digital image in order to create a processed image, the processing unit dewarping the digital image to remove distortion created by the imager while keeping a ratio between the number of image sensor pixels and a number of processed image pixels close to 1:1 in a region at the edge of the selected output field of view, the processed image having its field of view cropped to the selected output field of view value.

2. The method of claim 1, further comprising of:

e. outputting the processed image.

3. The method of claim 1, wherein the value corresponding to the minimum design field of view is defined such that a ratio between a maximum magnification and a minimum magnification is equal to a ratio between the minimum design field of view and the maximum design field of view.

4. The method of claim 2 wherein the processed image is outputted to a display device.

5. The method of claim 1, wherein the selection of the output field of view value is received from a user.

6. The method of claim 1, wherein the selection of the output field of view value is automatically received from an algorithm.

7. The method of claim 6, wherein the algorithm uses a spatial position and/or orientation of the imager to calculate the selected output field of view.

8. The method of claim 1, wherein the digital image distortion results from optical distortion in the imaging system of the imager.

9. The method of claim 8, wherein a smart binning process is applied to limit a number of pixels read by the image sensor or transmitted to the processing unit.

10. The method of claim 1, wherein the digital image distortion results from smart binning of pixels by the image sensor of the imager or by a smart binning unit.

11. The method of claim 1, wherein the digital image distortion results from a combination of optical distortion in the imaging system of the imager and smart binning of pixels.

12. The method of claim 1, wherein the digital image distortion is such that the magnification is maximum in a central area of the image and the magnification is minimum in an area near the maximum design field of view.

13. The method of claim 8, wherein the magnification for every output field of view θ in a region between the minimum design field of view and the maximum design field of view is such that:

$$\text{Magnification}(\theta) > \frac{\text{Min.design\_FoV}}{\theta}\text{Max.}Mag.$$

14. The method of claim 8, wherein the magnification at a given output field of view θ in a region between the minimum design field of view and the maximum design field of view is such that:

$$0.75\frac{\text{Min.design\_FoV}}{\theta}\text{Max.}Mag < \text{Magnification}(\theta) < 1.25\frac{\text{Min.design\_FoV}}{\theta}\text{Max.}Mag.$$

15. The method of claim 1, wherein the ratio between the number of image sensor pixels and the number of processed image pixels is up to 2:1 or 1:2 in a region at the edge of the selected output field of view.

16. The method of claim 1, wherein the imager includes multiple imaging systems and multiple image sensors for creating multiple digital images.

17. The method of claim 16, wherein the multiple digital images are stitched together before the processing by the processing unit.

18. The method of claim 1, wherein the continuous zoom optical system has no movable optical element.

19. The method of claim 1, wherein the continuous zoom optical system is combined with a digital zoom.

20. The method of claim 1, wherein the processing unit simultaneously processes a single digital image into multiple processed images having different selected output field of view values.

21. The method of claim 1, wherein the dewarping of the digital image creates a processed image following a known projection.

22. The method of claim 1, wherein the processed image is created by the processing unit without dewarping to remove distortion when the received selection of output field of view value is the value corresponding to the minimum design field of view.

23. The method of claim 1, wherein the digital image from the imager has a maximum magnification in an off-centered region of the image.

24. The method of claim 1, wherein the continuous zoom optical system is used with an auto focus, an auto exposure or an auto white balance process.

25. A continuous zoom optical system using an imaging system to create a digital image file having a variable magnification across a field of view in order to have a resolution ratio close to 1:1 between a number of image sensor pixels and a number of output image pixels in a region at an edge of a selected output field of view, the optical system comprising:

a. an imaging system creating in an image plane an optical image of a scene, the imaging system having optical distortion such that the optical image has a generally constant magnification from a center of the field of view up to a minimum design field of view and a generally decreasing magnification from the minimum design field of view up to a maximum design field of view;

b. an image sensor converting the optical image to a digital image, the image sensor including a plurality of image sensor pixels, and the digital image having a digital image distortion resulting from the optical distortion of the imaging system;

c. an output field of view value selection unit for receiving a selection of an output field of view value between a value corresponding to the minimum design field of view and a value corresponding to the maximum design field of view; and d. a processing unit processing the digital image in order to create a processed image, the processing unit dewarping the digital image while keeping a ratio between the number of image sensor pixels and a number of processed image pixels close to 1:1 in a region at the edge of the selected output field of view, the processed image having its field of view cropped to the selected output field of view value.

26. A continuous zoom optical system using smart binning from an image sensor to create a digital image tile having a variable magnification across a field of view in order to have a resolution ratio close to 1:1 between a number of image sensor pixels and a number of output image pixels in a region at an edge of a selected output field of view, the optical system comprising:

a. an imaging system creating in an image plane an optical image of a scene;

b. an image sensor converting the optical image to a digital image, the image sensor including a plurality of image sensor pixels;

c. a smart binning unit to do smart binning of the image sensor pixels such that the resulting digital image has a generally constant magnification from a center of the field of view up to a minimum design field of view and a generally decreasing magnification from the minimum design field of view up to a maximum design field of view;

d. an output field of view value selection unit for receiving a selection of an output field of view value between a value corresponding to the minimum design field of view and a value corresponding to the maximum design field of view; and e. a processing unit processing the digital image in order to create a processed image, the processing unit dewarping the digital image to remove distortion created by the smart binning unit while keeping a ratio between the number of image sensor pixels and a number of processed image pixels close to 1:1 in a region at the edge of the selected output field of view, the processed image having its field of view cropped to the selected output field of view value.

* * * * *